United States Patent [19]
Allen et al.

[11] Patent Number: 5,020,081
[45] Date of Patent: May 28, 1991

[54] COMMUNICATION LINK INTERFACE WITH DIFFERENT CLOCK RATE TOLERANCE

[75] Inventors: John D. Allen, Bolton; Jeffrey V. Hill, Malden, both of Mass.

[73] Assignee: Data General Corporation, Westboro, Mass.

[21] Appl. No.: 409,251

[22] Filed: Sep. 19, 1989

Related U.S. Application Data

[63] Continuation-in-part of Ser. No. 252,460, Sep. 30, 1988, now Defensive Publication No. 4.910,754.

[51] Int. Cl.⁵ .............................. H04L 7/00
[52] U.S. Cl. ........................ 375/118; 371/47.1
[58] Field of Search ............... 375/114, 116, 118, 119; 371/21.1, 21.4, 47.1; 370/108; 360/51, 54; 369/60

[56] References Cited

U.S. PATENT DOCUMENTS

| | | | |
|---|---|---|---|
| 3,245,040 | 4/1958 | Burdett et al. | 371/51 |
| 3,457,550 | 7/1967 | Gibson et al. | 375/121 |
| 4,021,609 | 5/1977 | Oyama et al. | 375/114 |
| 4,119,796 | 10/1978 | Jones | 375/118 |
| 4,234,919 | 11/1980 | Bruce et al. | 364/200 |
| 4,270,183 | 5/1981 | Robinson et al. | 375/118 |
| 4,354,230 | 10/1982 | Murphy et al. | 364/200 |
| 4,368,531 | 1/1983 | Chopping | 375/118 |
| 4,412,285 | 10/1983 | Neches et al. | 364/200 |
| 4,499,538 | 2/1985 | Finger et al. | 364/200 |
| 4,547,849 | 10/1985 | Louie et al. | 364/200 |
| 4,580,279 | 4/1986 | Kahn | 375/118 |
| 4,596,026 | 6/1986 | Cease et al. | 375/118 |
| 4,641,310 | 2/1987 | Martens et al. | 371/38.1 |
| 4,695,946 | 9/1987 | Andreasen et al. | 364/200 |
| 4,701,845 | 10/1987 | Andreasen et al. | 364/200 |
| 4,727,370 | 2/1988 | Shih | 340/825.1 |
| 4,764,942 | 8/1988 | Shigaki et al. | 375/118 |
| 4,782,498 | 11/1988 | Copeland, III | 375/8 |
| 4,907,186 | 3/1990 | Racey | 375/118 |

Primary Examiner—Benedict V. Safourek
Attorney, Agent, or Firm—Sewall P. Bronstein; Robert M. Asher

[57] ABSTRACT

A communication link interface having an assembly register which is loaded in response to a transmitter's clock rate and unloaded in response to a receiver's clock connected to the interface. The assembly register holds a series of data words received from the communication link. Logic gates or flip flops are provided to insure a time delay between loading the assembly register and unloading it.

27 Claims, 4 Drawing Sheets

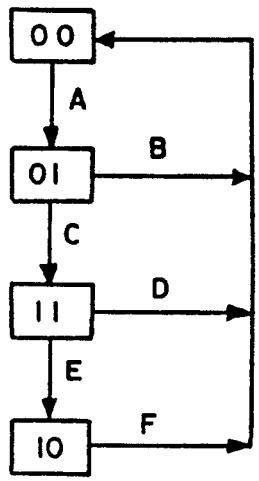

00 = RESET
01 = WAITING TO SEND 8 SYNC. MESSAGES & CORRECT / 4 SEC./SYNC. MESSAGE
11 = WAITING FOR A NON-SYNC. SIGNAL
10 = NORMAL

A = AUTOMATIC
B = RESET
C = AT LEAST 8 SYNC. MESSAGES SENT & AT LEAST 1 SYNC.
   MESSAGE CORRECTLY RECEIVED.
D = 3 SEQUENTIAL MESSAGES WITH ERRORS HAVE BEEN RECEIVED OR
   32 SYNC. MESSAGES HAVE BEEN RECEIVED OR
   8 MESSAGES OF ANY TYPE HAVE BEEN SENT BUT NO MESSAGES
   OF ANY TYPE HAVE BEEN RECEIVED OR RESET
E = A NON-SYNC. MESSAGE HAS BEEN RECEIVED
F = A SYNC. MESSAGE HAS BEEN RECEIVED OR
   3 SEQUENTIAL MESSAGE WITH ERRORS HAVE BEEN
   RECEIVED OR 8 MESSAGES (EITHER SYNCHRONIZATION OR
   NON-SYNCHRONIZATION) HAVE BEEN SENT BUT NO
   SYNCHRONIZATION OR NON-SYNCHRONIZATION MESSAGES HAVE
   BEEN RECEIVED OR RESET

FIG. 3

COMMUNICATION LINK INTERFACE WITH DIFFERENT CLOCK RATE TOLERANCE

This is a continuation-in-part of co-pending U.S. patent application Ser. No. 07/252,460, filed Sept. 30, 1988, now U.S. Pat. No. 4,910,754.

BACKGROUND OF THE INVENTION

The present invention is directed to a communication link interface between two hardware systems in which different clock rates are tolerated. In particular, the present invention permits a 2 to 1 data rate tolerance.

It has been the conventional practice in communicating between hardware systems to provide an intermediate clock rate usually common to neither the sending nor the receiving hardware system. Examples of this practice are Ethernet and other local area networks, T1 and other digital telephony systems.

It is an object of the present invention to connect two hardware systems without the use of an intermediate clock rate. This has the advantage of requiring less hardware, mostly for the reason that there is one less synchronization operation required. It is a further object of the present invention to connect two systems operating at their own different clock rates.

SUMMARY OF THE INVENTION

The invention is directed to a communication link interface for receiving data supplied at an independent clock rate over a communication link. Consecutive data words are received and loaded into an assembly register. After a designated number of consecutive data words has been received, they are loaded into the assembly register Four data words are loaded in the preferred embodiment. The loading of the assembly register takes place at the independent clock rate. The data words are moved from the assembly register at the receiver's self generated clock rate. A delay of at least a fraction of one clock cycle at the receiver's clock rate is provided before removing data from the assembly register in order to achieve synchronization.

In accordance with a further feature of the present invention, data transmitted over the communication link has a data portion which exceeds one half of a clock cycle at the independent clock rate and an opposite portion of the signal which lasts for the remainder of that clock cycle. This makes it easier to detect the data being sent in an environment with time skew between parallel signals and their clock.

Other objects and advantages of the invention will become apparent during the following description of the presently preferred embodiment of the invention, taken in conjunction with the drawings

BRIEF DESCRIPTION OF THE DRAWINGS

FIG. 3 is a logic state diagram for the current state control machine of the transmitter of FIG. 2.

DETAILED DESCRIPTION OF THE PREFERRED EMBODIMENT

Figure 1:
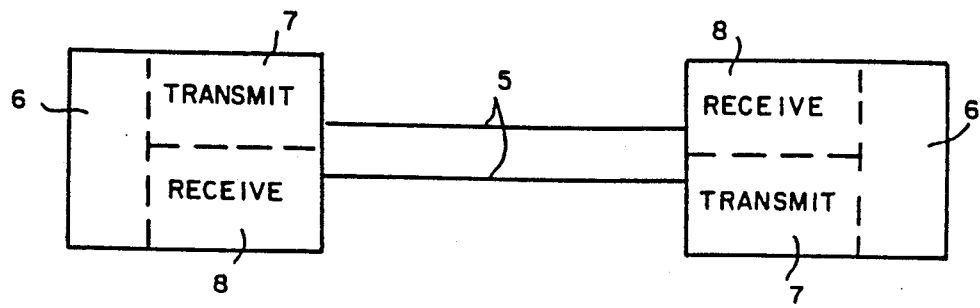
FIG. 1 is a schematic block diagram of two interfaces connected by a duplex bus.

Referring now to the drawings, a communication link is provided by a full duplex interchassis bus 5 as shown in FIG. 1. The bus has two separate sets of signal lines, the first for communications travelling in one direction and the second for communications travelling in the opposite direction. A computer chassis gets connected to the bus 5 by an interface 6. Each interface 6 includes a transmitter 7 and a receiver 8. The transmitter on one interface communicates with the receiver on the other interface. Since the two computer chassis connected by the bus are independent, it is necessary for a synchronization method to be employed so that information sent over the bus can be understood at the computer on the other end. In the preferred embodiment, messages are sent in packets of four serially transmitted parallel words Synchronization is required to identify which word being received is the first of four.

Figure 2:
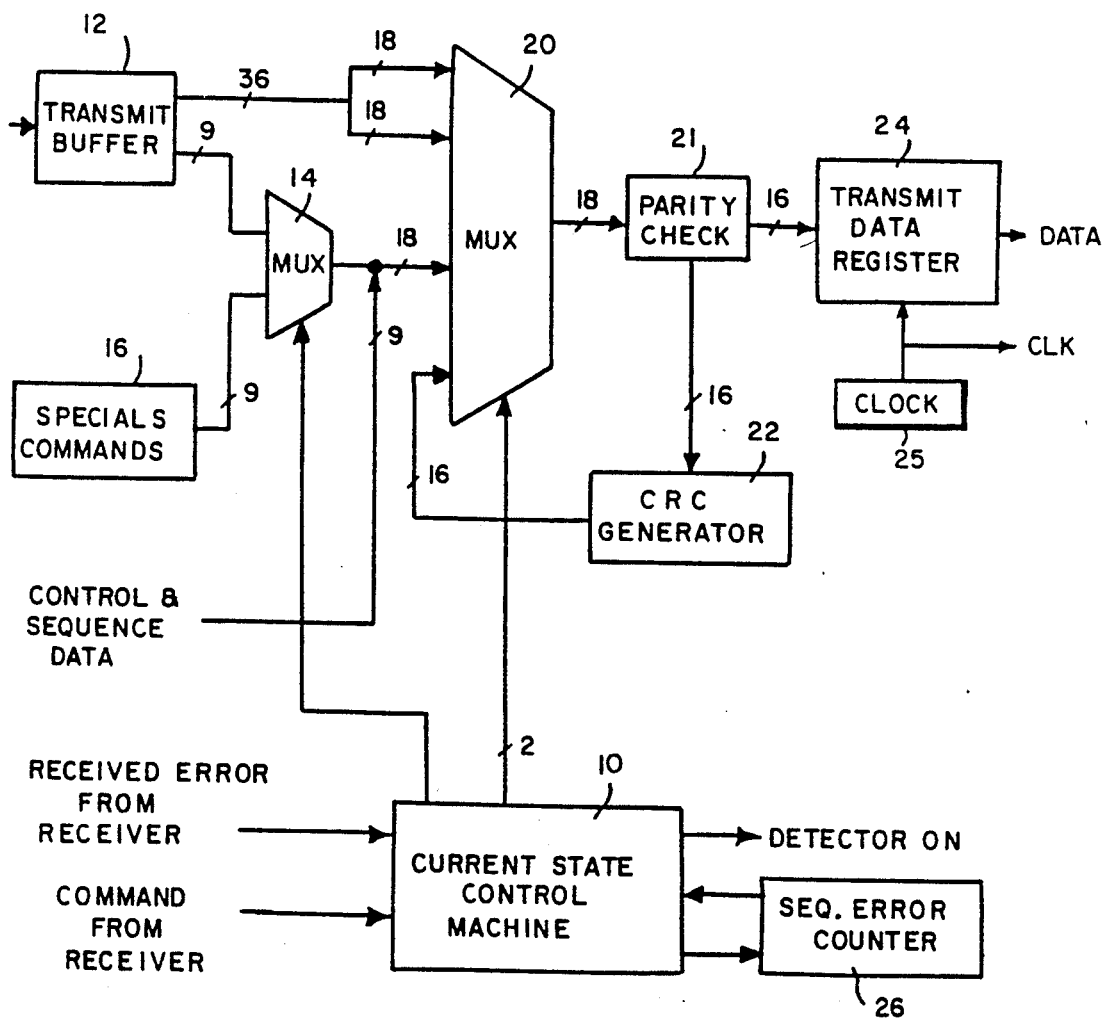
FIG. 2 is a schematic block diagram of a transmitter for use in the interfaces of FIG. 1.

FIG. 2 is a simplified schematic of a transmitter for use in a system with the present invention. A current state control machine 10 is added to the transmitter to implement the initialization and synchronization algorithm. Data which will eventually be sent out from the transmitter is initially stored in a transmit buffer area 12. 9 bits, comprised of 8 bits of data and a parity bit, is fed from the transmit buffer 12 into a mutliplexor 14. The multiplexor 14 also receives 9 bits of input from a set of special commands 16. Included among the special command set 16 would be a synchronization code. The code provides 8 bits representing the synchronization signal and a parity bit. The multiplexor 14 selects 9 bits either from the transmit buffer 12 or the special command set 16 in response to control signals from the current state control machine 10. Added to the 9 bit output from the multiplexor 14 is an additional 8 bits of control and sequence data along with the corresponding parity bit.

A 4×1 multiplexor 20 receives two 16 bit words of data along with parity bits from the transmit buffer 12, 9 bits from the multiplexor 14, 9 bits for the control and sequence data and 16 bits of error detection data. The error detection data is provided by a CRC generator 22 in the presently preferred embodiment. Of course, any conventional detection method deemed suitable by one skilled in the art may be used to generate the error detection data. The multiplexor 20 is controlled by the current state control machine 10. Bits are clocked out from the multiplexor 20 in parallel groups of 18. This includes 16 data bits and 2 parity bits. These are all fed into the parity check 21. Once the parity has been checked, the parity bits are no longer needed and the 16 data bits are passed into the CRC generator 22 and a transmit data register 24. The transmit data register 24 is a temporary storage for the data until it is sent out by the transmitter. As is conventional, the transmitter includes a clock 25 providing clock signals for maintaining synchronization among the components of the transmitter. The clock signals are transmitted along with the data.

In accordance with a feature of the present invention, the data bits sent out on the cable are specially encoded A conventional scheme of encoding known as Manchester encoding provides that the first half of a clock cycle provide the data portion and that the second half of the clock cycle be an opposite value to that of the data. Manchester encoding is used as a simple method of guaranteeing data transitions at a certain minimum rate regardless of the data being transmitted. A minimum rate of data transitions are required in any system that is AC coupled or in any system that is having a clock extracted from the data stream.

In the case of the current system, there are a number of parallel signal lines being sent down a parallel cable of some substantial length in parallel with a clock. In this system, the loss of the cable is low enough that the limiting factor in the length of the cable is the variation in arrival time at the far end of the cable of the different signal lines with respect to the clock line. The invention's encoding method is to make the data portion longer than one half of the clock cycle. The remaining portion is correspondingly shortened. This allows for more skew between the clock and the data and therefore a longer cable is permitted.

In accordance with the presently preferred embodiment, messages are transmitted as four 16 bit words. Each 16 bit word is sent out one after another. A message is complete after all four 16 bit words have been transmitted. Synchronization is required so that a receiver knows which 16 bit word is the first in a four word message. Otherwise, the messages could not be understood. The presently preferred embodiment is designed for use on a full duplex cable in which there is a first line for transmitting and a second line for receiving data.

The current state control machine 10 is connected to a sequential error counter 26. A received error signal from the receiver is conducted over a line into the current state control machine, thus the machine can keep track of the number of messages which are received that contain errors. The sequential error counter 26 keeps a count of each message containing an error as they occur sequentially. A total of three or more sequential errors in accordance with the presently preferred embodiment would cause the current state control machine to enter into its synchronization routine, since in such an instance there is a communicaton problem which may have been caused by a loss of synchronization.

The current state control machine 10 is also provided with a command signal from the receiver which would indicate if a synchronization signal has been received. If the interface at the other end of the interchassis bus has sent a synchronization signal, it is necessary for the transmitter at the end which receives that synchronization signal to enter into its synchronization algorithm to resynchronize communications over the interchassis bus. The current state control machine also provides a DETECTOR ON signal which is sent to the receiver portion of the cable interface. The use of this signal is discussed below in conjunction with the receiver and the algorithm performed by the current state control machine.

The algorithm employed by the current state control machine 10 for initializing the communications over the interchassis bus is shown in FIG. 3. When one interface on the bus powers up, it will employ the algorithm to effect initialization of bus communications. It is contemplated that in communicating over the interchassis bus that communications will continue in both directions at all times. If there is no data that needs to be sent, an idle message will be sent just to maintain the synchronization in effect throughout the communications. Should synchronization be lost at any time, the algorithm of the present invention will be implemented to resynchronize communications over the line.

The base state 00 is where the state machine begins upon powering up or after a reset signal. The state machine automatically changes to the state 01 at the next clock signal. Also, the current state control machine sends the DETECTOR ON signal to the receiver portion of the interface so that the receiver will begin to look for a synchronization message and otherwise stop processing incoming data. In the state 01, the current state control machine 10 causes synchronization signals to be sent out on the interchassis bus 5. Each synchronization signal is followed by three other 16 bit words. The first two words of these three words are irrelevant, but the final word is the error checking word. The error checking word enables the other side of the communication line to make sure that it has correctly received a message. The presently preferred synchronization signal is specifically FF72. When the next two data words sent along with the synchronization signal are all 0's, the CRC-16 error checking word is C61E. These four data words comprise a synchronization message.

The state control machine will cause at least eight synchronization messages to be transmitted out over the communication link. The minimum number 8 was chosen becuase it gives the receiver enough time to recover from a synchronization signal received in a message with errors. It was also selected because it is a factor of two making it more convenient. Other minimum numbers may be selected which would work just as well for other particular systems In state 01, the current state control machine waits for at least eight synchronization messages to be sent out, but will also be waiting to receive correctly at least one synchronization message from the interface at the other side of the communication link. Once both these conditions have been met, the control state machine changes state from 01 to 11. Until the synchronization message is received, the transmitter continues sending out synchronization messages. When the state changes to 11, the transmission of synchronization messages is terminated. Should a reset signal arrive prior to the sensing of the two conditions, the control state machine returns to state 00. While the control state machine waits for a correctly received synchronization message, if a synchronization signal is received in a message having a CRC error, then the control state machine reasserts the DETECTOR ON signal so that the receiver continues waiting for a synchronization signal In state 11, the current state control machine awaits to hear of receipt of a non-synchronization message at the receiving portion of the interface. Once the first non-synchronization message is received, the current state control machine moves into the normal state identified as 10. There are a number of conditions however which will prevent the control machine from going from state 11 to state 10. These conditions will cause the state machine to return to the RESET mode in state 00. One such reset causing condition is the occurence of three sequential messages containing errors. If the number reaches three, it may be indicative of an error in the synchronization process and a reset is caused to start the process all over. Another problem is indicated if the interface receives 32 synchronization messages before receiving a non-synchronization message. In such a situation, apparently the interface on the other side of the communication link has not been able to detect the synchronization message being sent from this side of the link. Therefore, the state machine causes the synchronization process to start all over again. A third reset causing condition is if while in state 11, the transmitter sends out eight messages but does not receive any messages of any kind from the other end of the communication link.

In the normal mode, 10, the synchronization process will be started whenever an interface receives a synchronization message from the other side of the communication link. Also, synchronization may be started whenever three messages are received sequentially, each containing errors. Thirdly, if the receiving line goes dead and eight messages are sent out by the transmitter without any messages of any kind being received over the receiver interface, then synchronization will be reinitiated. Finally, a reset signal at any time would cause the initialization/synchronization algorithm to restart.

In this manner, the intercommunications over the communication link between the two interfaces can be maintained in operation automatically. If there is a power surge or if one of the boards is removed, the interfaces on the communication link enter into the synchronization process until synchronization is successfully restored. Besides this automatic handling of synchronization, a reset signal may be provided to the transmitter interface to purposefully cause synchronization to be entered into.

Figure 4:
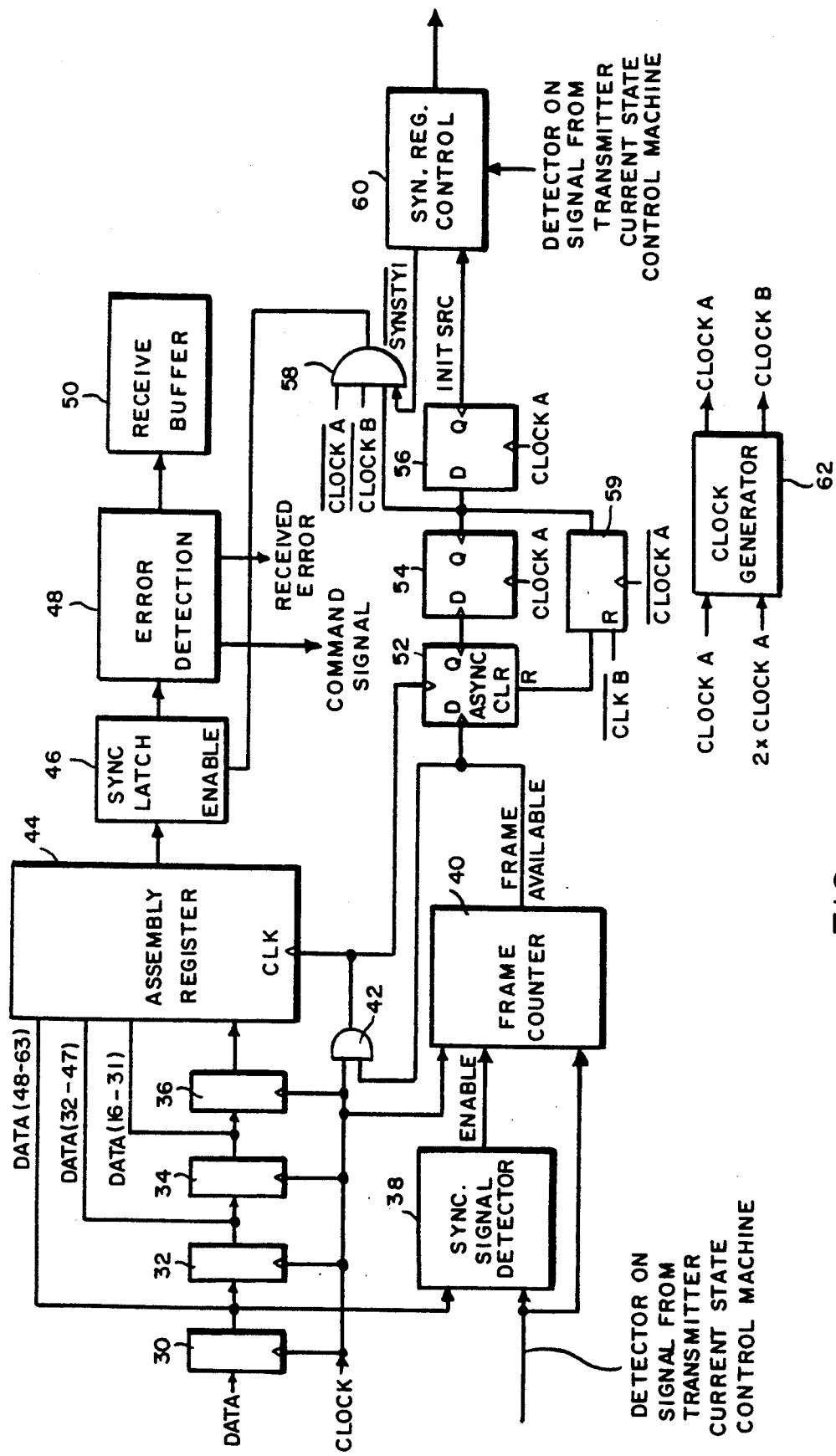
FIG. 4 is a schematic block diagram of a receiver of the present invention for use in the interfaces of FIG. 1.

Referring now to FIG. 4, the present invention is described with respect to the receive portion of the communication link interface. Data coming into the interface from off of the communication link is provided to a series of registers 30, 32, 34, 36. Data is provided at the independent clock rate of the transmitting system. The transmitter sends its clock signal along with the data. At each of the transmitter's clock cycles, each register passes its contents to the next register in line. The first register 30 takes its data in the form of a 16 bit word directly or indirectly from the communication link and then passes its contents to the next register in line.

Whenever an initialization or synchronization process begins, the control state machine in the transmitter portion of the interface (not to be confused with the transmitter at the other end of the communication link) sends a DETECTOR ON signal to a sync signal detector 38 in the receiver portion of the interface. The sync signal detector 38 is only activated in response to this DETECTOR ON signal. When it is activated it receives the data stored in the first register 30. That data is directly compared with the known sync signal which in the presently preferred embodiment is FF72. Using conventional circuitry comprised of a number of logic gates if all 16 bits match the 16 bit sync signal then an enable signal is sent out by the sync signal detector 38 to indicate that a synchronization signal has been received. The enable signal is provided to a frame counter 40 which counts 4 clock cycles on the transmitter's clock signal.

The frame counter 40 generates a FRAME AVAILABLE signal when the synchronization signal is in the fourth and final register 36. Thereafter, every four clock cycles of the transmitter's independent clock signal, the counter will generate a FRAME AVAILABLE signal to provide timing in synchronization with the receipt of messages. The sync signal detector 38 will not be used thereafter until another DETECTOR ON signal is received.

In accordance with an alternative embodiment, the frame counter 40 can be made variable so that the system may be used for messages having a number other than 4 parallel words. To operate under this alternate scheme, a message length code would need to be sent with or immediately following a synchronization signal. The length code could be provided to the counter to set it for the desired number of parallel words per message. Then, the frame counter 40 would generate the FRAME AVAILABLE signal after every desired number clock signals as set by the length code. In this manner, the present scheme may be used in a system which can vary the number of parallel words per message.

The FRAME AVAILABLE signal is fed along with the incoming clock signal to an AND gate 42 so that upon a coincidence of a clock cycle and the FRAME AVAILABLE signal, an assembly register 44 is loaded with the contents of all four of the series of registers 30, 32, 34, 36. Assembly register 44 holds all 64 of the bits contained by these registers Thus, an entire message is held by the assembly register 44.

In accordance with the present invention, the entire message is removed from the assembly register after a delay proportional to the receiver's clock cycle. Simultaneously with instructing the assembly register to load, the AND gate 42 operates a flip flop 52. The flip flop 52 receives the FRAME AVAILABLE signal At the next clock signal from the receiver's clock, flip flop 54 is operated to receive the FRAME AVAILABLE signal from flip flop 52. Since flip flop 52 operated in response to the transmitter's clock and flip flop 54 was responsive to the receiver's clock, the transfer between flip flop 52 and flip flop 54 can take place anywhere from instantaneously up to one receiver's clock cycle.

Once flip flop 54 has received the FRAME AVAILABLE signal, that signal is fed into AND gate 58. AND gate 58 receives two other signals from a clock generator 62 on the receiver. The receiver's clock is identified in the figure as clock A. The signal not clock A is fed into the AND gate 58. Thus, after the clock A has operated flip flop 54, the AND gate 58 must wait until the not clock A signal is true. This will take ½ of the clock cycle. The clock generator 62 produces a clock B signal which is a 90° phase shifted version of clock A. In the presently preferred embodiment, the clock generator 62 uses a signal at twice the rate of clock A and combines it with the original clock A to produce the clock B signal. A not clock B signal is then fed into the AND gate 58. Thus, AND gate 58 will not be true until ¾ of a clock cycle after flip flop 54 has been filled with the FRAME AVAILABLE SIGNAL. This imposes a minimum delay time after the frame available signal is passed into flip flop 54. In this embodiment, data must be held in the assembly register at least $\mu$ of a clock cycle before unloading, even if there is a receiver's clock signal immediately following the frame available signal.

A half clock cycle after the FRAME AVAILABLE signal is transferred into the flip flop 54, a flip flop 59 is loaded with the FRAME AVAILABLE signal This is used then to immediately clear or reset the initial flip flop 52. Flip flop 52 must be cleared within one clock cycle so that flip flop 54 will be cleared one clock cycle after receiving the available signal. This avoids unloading the same data twice from the assembly register.

A full clock cycle after the FRAME AVAILABLE signal is transferred into flip flop 54, a flip flop 56 is loaded with the FRAME AVAILABLE signal Flip flop 56 immediately provides the signal to a sync register control machine 60. The signal into the sync register control 60 is referred to as INITSRC. The sync register control 60 cycles through four states at 2 times the receiver's clock rate so that there are four states in the time that two receiver clocks go by. These states are synchronized to the INITSRC signal which is the output of flip flop 56. In particular, the INITSRC signal from flip flop 56 releases the sync register control machine 60 so that it can cycle out of state 00. On each 2X clock cycle, the control machine then cycles through states 01, 11 and 10 and back to state 00 at which point it has to wait for INITSRC before it starts changing states again. These four states are used to control the circuitry that processes the data in the SYNC LATCH and guarantees that the processing is all done within two receive clock cycles (four 2X cycles).

SYNSTY1 is the state machine bit 1. When the four states are 00, 01, 11 and 10 then SYNSTY1 first becomes true at state 01. The not SYNSTY1 term is fed back to the AND gate 58 to enable loading of the SYNC LATCH when the sync register control machine is in the 00 or 10 states but disable loading when the sync register control machine is in the 01 or 11 states. This prevents the reloading of the SYNC LATCH while the data from it is being processed. This protection is required when the receiving clock is slower than the transmitting clock. If the receiving clock is faster than the transmitting clock, the four states are finished long before the flip flop 56 output becomes true again and the sync register control machine stays in state 00 until that happens. The sync register control machine also is set to 00 upon receiving the DETECTOR ON initialization signal from the transmitter.

Flip flop 54 and the AND gate 58 provide at least a ¾ of a clock cycle delay before the entire message is removed from the assembly register 44 and transferred through a sync latch 46. The AND gate 58 enables the sync latch 46. Thus, the data in the sync latch 46 will be good at the beginning of the next clock A clock cycle. Now the data can be removed in parallel by the sync latch 46 synchronously with the receiver's clock.

After the sync latch 46, the receiver then provides the parallel data message to error detection circuitry 48. In accordance with the presently preferred embodiment, the fourth word in a message is a CRC error detection word. The error detection circuitry 48 compares the error detection word with the word that should be generated to agree with the other three words in the message. If there is one-to-one correspondence between the expected word and the CRC word which is received, then no error has been detected and the message is passed into a receiver buffer 50. If an error is detected, error received is generated by the error detection circuitry. The received error signal is sent to the transmit portion of the interface where it is used by the current state control machine as discussed above.

Further, a command signal is forwarded from the error detection circuitry 48 to the transmit portion of the interface. The command signal indicates what type of message has been received. This signal is used by the current state control machine to determine when a synchronization message or a non-synchronization message has been received. When the message received by the receiver is a synchronization message, the current state control machine will take action as described with respect to the flow diagram of FIG. 3 depending upon what state it is in. In combination with the command signal, the error received signal informs the current state control machine when a synchronization message has been correctly received. After completing the error detection circuitry, the message is passed into a receive buffer 50 where it is handled in conventional ways.

Figure 5:
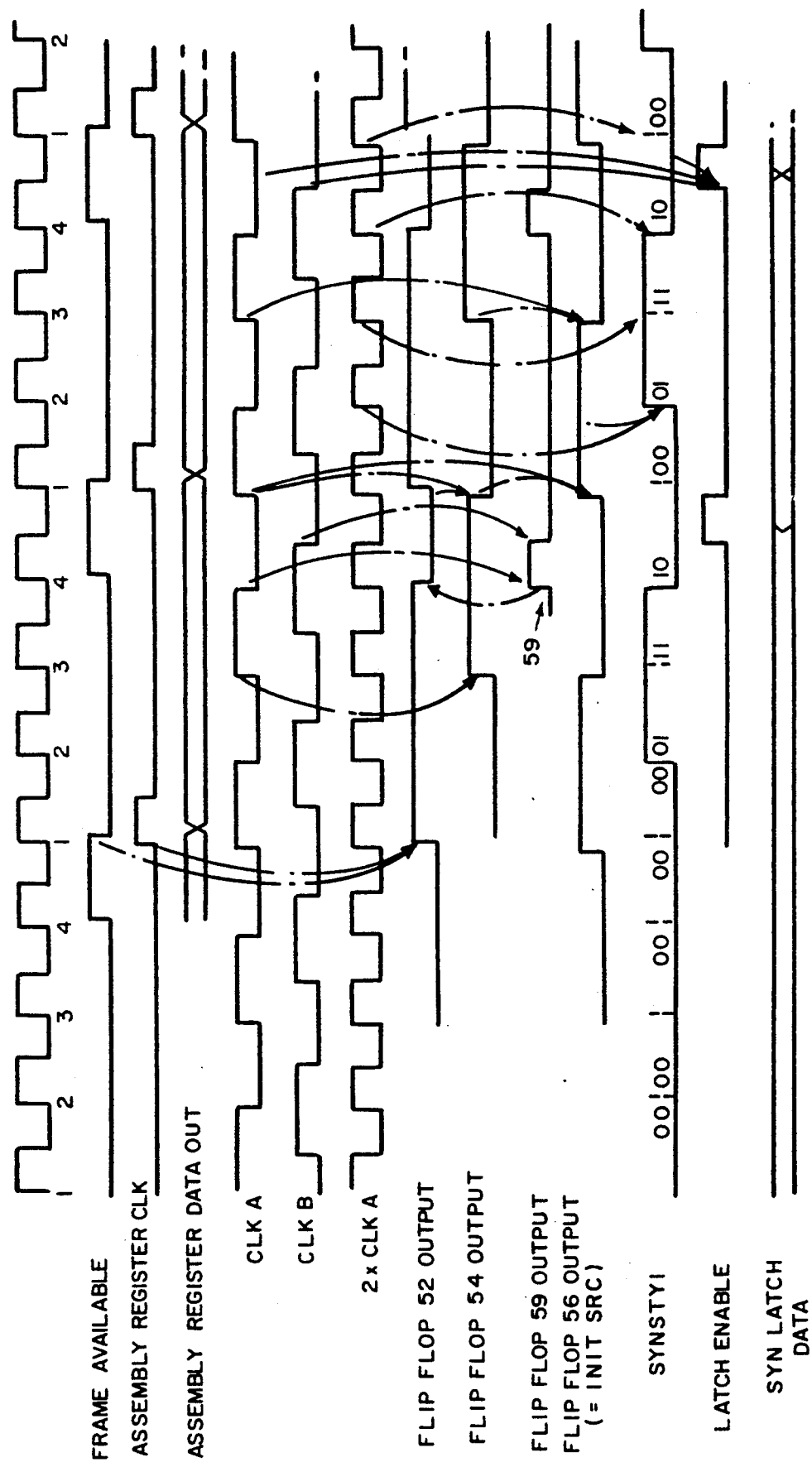
FIG. 5 is a timing diagram illustrative of the present invention.

Referring now to FIG. 5, a timing diagram illustrative of the present invention is shown. In accordance with the preferred embodiment, a tolerance of 2 to 1 is possible between the clock rates of the transmitter and receiving system. Shown in the diagram is an example in which the clock of the receiver is ½ as fast as the clock of the transmitting system. Just after four data words are input in the registers 30, 32, 34 and 36, the FRAME AVAILABLE signal goes true. At the next clock cycle of the transmitting clock, AND gate 42 provides a true signal to the assembly register 44 causing the assembly register to be loaded. The data in the assembly register is good as soon as the register is loaded which takes a miniscule portion of a clock cycle. A signal from the AND gate 42 is also provided to flip flop 52 which goes true simultaneously with the assembly register data. At the next occurrence of the clock of the receiver, identified as clock A, the FRAME AVAILABLE signal is passed from flip flop 52 into the second flip flop 54. Then AND gate 58 waits for not clock A and not clock B which occurs ¾ of a cycle later. At this point, the latch enable is activated and good data can be obtained from the sync latch 46. That data will be accessed by the receiver in synchronization with the receiver's clock signal. Meanwhile, ½ of a clock cycle after FRAME AVAILABLE was shifted into flip flop 54, it is passed into flip flop 59 which resets the first flip flop 52. As can be seen even though the clock of the receiver was ½ the speed of the clock of the transmitter, data could be accurately communicated from one system to the other. FIG. 5 shows the worst case in which it was almost a full clock cycle before the FRAME AVAILABLE was passed from flip flop 52 to flip flop 54. The present invention provided for the transfer of data from the assembly register to the sync latch about one quarter of a clock cycle prior to a loading of the assembly register with the next message.

If the receiver clock A is twice as fast as the transmitter clock, the sync register control 60 prevents the receiver from reading the received message more than once. Even in our diagram where clock A is slow, there are two clock cycles in which the synch latch data is good. However, the data is only read when the synch register control 60 is in state 01 or 11. Thus, the present system can interact within another interface whose clock is either twice as fast or twice as slow.

In accordance with an alternative embodiment, instead of providing the delay through the use of AND gate 58, the enable signal can be provided by the output of flip flop 56 and a register could be substituted for the latch 46. This would simplify the design by eliminating the need for the AND gate 58.

Of course it should be understood that other changes and modifications to the preferred embodiment described above will be apparent to those skilled in the art. For example, the four words per message can be changed to accommodate a particular system's needs and achieve a different clock tolerance ratio. Furthermore, the communication link may be a duplex cable, radio, microwave, fiber optic or other conventional communication links. These and other changes can be made without departing from the spirit and scope of the invention and without diminishing its attendant advantages. It is therefore intended that such changes and modifications be covered by the following claims.

We claim:

1. A communication link interface for receiving data supplied at an independent clock rate over a communication link comprising:
   an assembly register for holding n consecutive data words in parallel, where n is an integer greater than or equal to 2;
   means, responsive to the independent clock rate on the communication link, for simultaneously loading n consecutive data words into said assembly register;
   a clock for providing a receiver's clock signal in each of a continuous series of clock cycles; and
   means, responsive to said receiver's clock signal, for causing said n consecutive data words to be taken simultaneously in parallel from said assembly register after a delay of at least a fraction of one clock cycle.

2. The communication link interface of claim 1 wherein said means for loading said assembly register comprises a series of n registers connected in sequence to propagate data from one of said registers to another in said sequence as said data words are received from the communication link.

3. The communication link interface of claim 2 wherein said means for loading further comprises a frame counter that counts n clock cycles on the independent clock rate to provide an available signal to said assembly register when the data is ready to be loaded from said registers.

4. The communication link interface of claim 1 wherein said means for causing comprises a series of at least two flip-flops connected to receive an available signal when said assembly register is loaded and propagate it from one flip-flop to another in response to said receiver's clock signal.

5. The communication link interface of claim 4 further comprising means for clearing a first of said at least two flip-flops after the available signal has propagated to a second of said flip-flops and before a predetermined number of clock cycles.

6. The communication link interface of claim 5 wherein said means for clearing comprises a flip-flop which resets the first of said at least two flip flops after less than one clock cycle from when the available signal is propagated from said first flip flop.

7. The communication link interface of claim 4 wherein said means for causing further comprises a latch connected to said assembly register and a logic gate for activating said latch in response to the available signal from one of said flip-flops and a delay imposed by signals responsive to said receiver's clock signal.

8. The communication link interface of claim 7 further comprising control means for cycling through a series of states and connected to said logic gate so that when said control means is in a state indicating that data in said latch is still being processed, said latch is prevented from being reactivated.

9. The communication link interface of claim 4 wherein said means for causing further comprises a register connected to said assembly register for taking said data words from said assembly register in response to said flip-flops.

10. The communication link interface of claim 1 wherein data bits provided over said communication link have a data portion which exceeds one half of a clock cycle at said independent clock rate and an opposite portion which lasts for the remainder of said clock cycle.

11. The communication link interface of claim 1 further comprising a synch signal comparator which is activated in response to an ON signal, said synch signal comparator receiving a copy of the data from said means for loading and comparing it with a synchronization signal to generate an enable signal when the data matches the synchronization signal to permit the commencement of loading of said assembly register.

12. The communication link interface of claim 1 wherein n is an integer greater than or euqal to 4.

13. A method for receiving data supplied at an independent clock rate over a communication link comprising the steps of:
   inputting data words received from the communication link consecutively into a first of a series of registers;
   propagating said data words through said registers at said independent clock rate;
   periodically loading a plurality of said data words from said series of registers simultaneously in parallel into an assembly register in response to an available signal;
   holding said plurality of data words in said assembly register for at least a fraction of one clock cycle of a receiver's signal;
   removing said plurality of data words simultaneously in parallel from said assembly register in response to the receiver's clock signal and the available signal.

14. The method of claim 13 further comprising the step of counting at the independent clock rate and wherein said step of periodically loading happens every nth count, where n is an integer.

15. The method of claim 13 further comprising the step of comparing a data word received from the communication link with a sync signal and initiating said periodic loading after a match is found between a data word and the sync signal.

16. The method of claim 13 further comprising the step of propagating the available signal through a series of flip-flops following the step of loading.

17. The method of claim 16 further comprising the step of resetting a first flop-flop in the series of flip flops in less than one clock cycle of the receiver's clock signal after the available signal is propagated from said first flip-flop.

18. The method of claim 13 further comprising the steps of temporarily storing the data words removed from said assembly register in a latch, processing the data words in said latch and preventing removal of additional data words from said assembly register until after said processing step is completed.

19. A communication link interface for receiving data supplied at an independent clock rate over a communication link comprising:
   a series of n registers connected in sequence to propagate data from one of said registers to another in said sequence as said data words are received at the independent clock rate from the communication link, where n is an integer greater than or equal to 2;
   an assembly register for receiving a plurality of data words simultaneously in parallel from said registers;

means for generating an available signal when the data is ready to be loaded from said registers into said assembly register;

a clock for providing a receiver's clock signal in each of a continuous series of clock cycles; and means, responsive to said available signal and said recieiver's clock signal, for causing the plurality of data words in said assembly register to be removed simultaneously in parallel after a delay following the generation of the available signal.

20. The communication link interface of claim 19 wherein said means for causing comprises a series of at least two flip-flops connected to receive said available signal and propagate it from one flip-flop to another in response to said receiver's clock signal.

21. The communication link interface of claim 20 wherein said means for causing further comprises a latch connected to said assembly register and a logic gate for activating said latch in response to the available signal from one of said flip-flops and a delay imposed by signals responsive to said receiver's clock signal.

22. The communication link interface of claim 20 wherein said means for causing further comprises a register connected to said assembly register for taking said plurality of data words from said assembly register in response to said flip-flops.

23. The communication link interface of claim 20 further comprising means for clearing a first of said at least two flip-flops in less than one clock cycle after the frame available signal has propagated to a second of said flip-flops.

24. The communication link interface of claim 19 wherein data bits provided over said communication link have a data portion which exceeds one half of a clock cycle at said independent clock rate and an opposite portion which lasts for the remainder of said clock cycle.

25. The communication link interface of claim 19 further comprising a synch signal comparator which is activated in response to an ON signal, said synch signal comparator receiving a copy of the data from said means for loading and comparing it with a synchronization signal to generate an enable signal when the data matches the synchronization signal to permit commencement of loading of said assembly register.

26. The communication link interface of claim 19 wherein n is an integer greater than or equal to 4.

27. A receiver for use in a communication link interface comprising:

n registers, where n is an integer greater than one, connected in sequence to propagate data from one of said registers to another in said sequence as it is received from the communication link;

a synch signal comparator which is activated in response to an ON signal, said synch signal comparator receiving a copy of the data from one of the registers in the sequence of registers and comparing it with a synchronization signal to generate an enable signal when the data matches the synchronization signal;

a frame counter, responsive to the enable signal, for generating a first available signal at a predetermined clock delay following the enable signal and for then generating an available signal every n clock signals following the generation of the first available signal;

means for assembling the data stored in all n registers into a single parallel set of data in response to said available signal means for checking said single parallel set of data for errors and for generating an error signal if an error is detected; and means for storing said single parallel set of data if no error is detected.

* * * * *

UNITED STATES PATENT AND TRADEMARK OFFICE
CERTIFICATE OF CORRECTION

PATENT NO. : 5,020,081

DATED      : May 28, 1991

INVENTOR(S) : John D. Allen, Jeffrey V. Hill

It is certified that error appears in the above-identified patent and that said Letters Patent is hereby corrected as shown below:

On the title page, under Related U.S. Application Data, please delete "now Defensive Publication No. 4,910,754." and insert --now U.S. Patent No. 4,910,754.--

Signed and Sealed this

Twentieth Day of October, 1992

*Attest:*

DOUGLAS B. COMER

*Attesting Officer*       *Acting Commissioner of Patents and Trademarks*